United States Patent [19]

Allies et al.

[11] Patent Number: 5,560,838

[45] Date of Patent: Oct. 1, 1996

[54] PROCESS AND APPARATUS FOR CONVERTING SPENT ETCHANTS

[75] Inventors: Victoria R. Allies, Phoenix; Mark F. Lloyd, Chandler; James M. McCarron, Phoenix, all of Ariz.

[73] Assignee: Training 'N' Technology, Inc., Tempe, Ariz.

[21] Appl. No.: 350,198

[22] Filed: Dec. 5, 1994

[51] Int. Cl.$^6$ ...................................................... C23F 1/00
[52] U.S. Cl. ............................ 216/93; 156/345; 216/105
[58] Field of Search ................. 216/93, 105; 156/626.1, 156/627.1, 642.1, 345 L, 345 M, 345 C; 134/10

[56] References Cited

U.S. PATENT DOCUMENTS

| | | |
|---|---|---|
| 3,784,455 | 1/1974 | Parikh et al. . |
| 4,058,431 | 11/1977 | Haas ........................................ 216/93 X |
| 4,252,621 | 2/1981 | Reinhardt et al. . |
| 4,428,773 | 1/1984 | Krotz . |
| 4,696,717 | 9/1987 | Bissinger .................................. 216/93 |
| 4,915,776 | 4/1990 | Lee . |
| 5,085,730 | 2/1992 | Cordani . |
| 5,186,811 | 2/1993 | Otani et al. . |
| 5,188,703 | 2/1993 | Greenberg . |
| 5,211,843 | 5/1993 | Wester et al. . |
| 5,227,010 | 7/1993 | Lubert et al. . |
| 5,248,398 | 9/1993 | Cordani . |

*Primary Examiner*—William Powell
*Attorney, Agent, or Firm*—O'Connor, Cavanagh; Donald J. Lenkszus

[57] ABSTRACT

Cupric chloride etchant waste is converted into non-hazardous material consisting of copper oxide and salt water. The cupric chloride etchant is preheated and a stream of the etchant is combined with a stream of preheated caustic solution. A neutralization reaction occurs in the mixed stream which is directed to a mixing tank. The reaction completes in the mixing tank without addition of heat, producing fine copper oxide which is filtered out from the salt water. The entire apparatus for carrying out the process can be integrated into a single portable unit.

28 Claims, 6 Drawing Sheets

5,560,838

PROCESS AND APPARATUS FOR CONVERTING SPENT ETCHANTS

BACKGROUND OF THE INVENTION

This invention relates, in general, to a process and apparatus for converting etchants into non-hazardous material. More particularly, the present invention relates to a process and apparatus for converting cupric chloride etchant waste into non-hazardous material and for recovering copper in an oxide form from cupric chloride etchant.

One of the most critical steps in the manufacture of printed circuit boards is the etching of the unwanted copper from the substrate to form a circuit pattern. The substrate is a panel (usually 18"×24") consisting of an insulating material made of a glass fiber weave impregnated with an epoxy resin, a paper based material impregnated with a phenolic resin, or a combination of both. This base material is then laminated to sheets of copper on one or both sides, forming the substrate from which printed circuits are made. In order to form the pattern, the substrate is coated with a photoimageable mask, commonly called dry film. New developments have resulted in the use of a "wet" photoimageable mask. A photographic pattern is placed on top of this mask and exposed to a concentrated light source. The image is then developed and the unwanted portion is washed off, leaving a hardened mask over the pattern which will form the circuit pattern desired. This mask now acts as an etch resist and the unwanted copper is removed by immersion in a cupric chloride solution. Once the copper is removed, the panel is ready for the rest of the steps involved in making a finished printed circuit board.

Once the etching baths have reached the end of their useful life, they must be treated or disposed of in a manner that eliminates the elements that make it a hazardous waste.

In batch processing, when the etchant has reached its useful life, the spent solution is pumped to a holding tank for disposition. The solution usually contains 15 to 25 ounces of copper per gallon and is classified as a hazardous waste. The current methods for disposal are to ship the spent material to a recycler or a treatment company. The material has to be manifested as a hazardous waste.

In continuous processes, an oxidizer is used to revitalize the etchant. However, in doing so, excess etchant is created which must be disposed. Etchant solutions must be disposed of in an environmentally acceptable manner.

Regeneration of the etching solution by electrowinning is a common approach along with precipitation procedures. However, electrowinning releases chlorine gas which must be captured and used in oxidizing the etchant bath. In the precipitation process, the removal of all, or a significant portion of the heavy metal content by precipitation methods as commonly used results in a sludge that is still considered a hazardous waste and is disposed of in a hazardous waste landfill.

SUMMARY OF THE INVENTION

Our invention is directed to the conversion of etchant into non-hazardous materials. In accordance with our invention, spent cupric chloride etchant is converted into non-hazardous copper oxide and a non-hazardous saline water solution. The copper oxide may be used as feedstock for mining operations and the saline solution can be filtered and discharged for standard wastewater treatment. The copper recovery in our process and system is 98% or better. The copper is recovered in an oxide form, which has been declared non-hazardous in the preamble to 40 CFR 261.2[c] [3].

In accordance with one aspect of the invention, spent cupric chloride and a sodium hydroxide solution are each preheated, the preheated solutions are pumped as streams through a mixing zone in which the two streams converge and combine to form a mixed stream. An exothermic reaction begins in the mixed stream. Once the mixed stream reaches the mixing tank, the reaction continues and becomes an endothermic reaction until the copper is precipitated as copper oxide in a saline solution. Further, in accordance with the invention, control of heat, pH and volumetric mixing results in a total reaction time of less than one hour and substantially complete extraction of the copper in solution. The saline water contains less than 1 ppm (parts per million) of copper.

Apparatus in accordance with the invention includes a batch processing system in which spent cupric etchant solution is received in a first tank and is preheated to a predetermined temperature. A second tank contains a caustic solution which is preheated to a predetermined temperature. First and second pumps respectively pump the heated spent etchant and the heated caustic solutions.

The pumped streams of the etchant and caustic solutions are pumped into a mixing zone and combined into a mixed stream. The combined stream as well as the byproducts of the reaction which occurs flow into a mixing tank where the reaction is allowed to continue to completion. The resulting copper oxide is separated from the saline solution by means of a filter bag.

Further in accordance with the invention, the system automatically cycles into a rinse mode to prevent crystallization in its pumps and oxide cake from clogging the static mixer and building up on the in-line pH probe. During operation, the pH of the mixed stream is monitored and the flow of the mixed streams are adjusted to maintain a desired pH.

BRIEF DESCRIPTION OF THE DRAWING

Other features and advantages of the invention, will be better understood from a reading of the following detailed description of an illustrative embodiment, taken in conjunction with the accompanying drawing in which.

DETAILED DESCRIPTION

Figure 1:
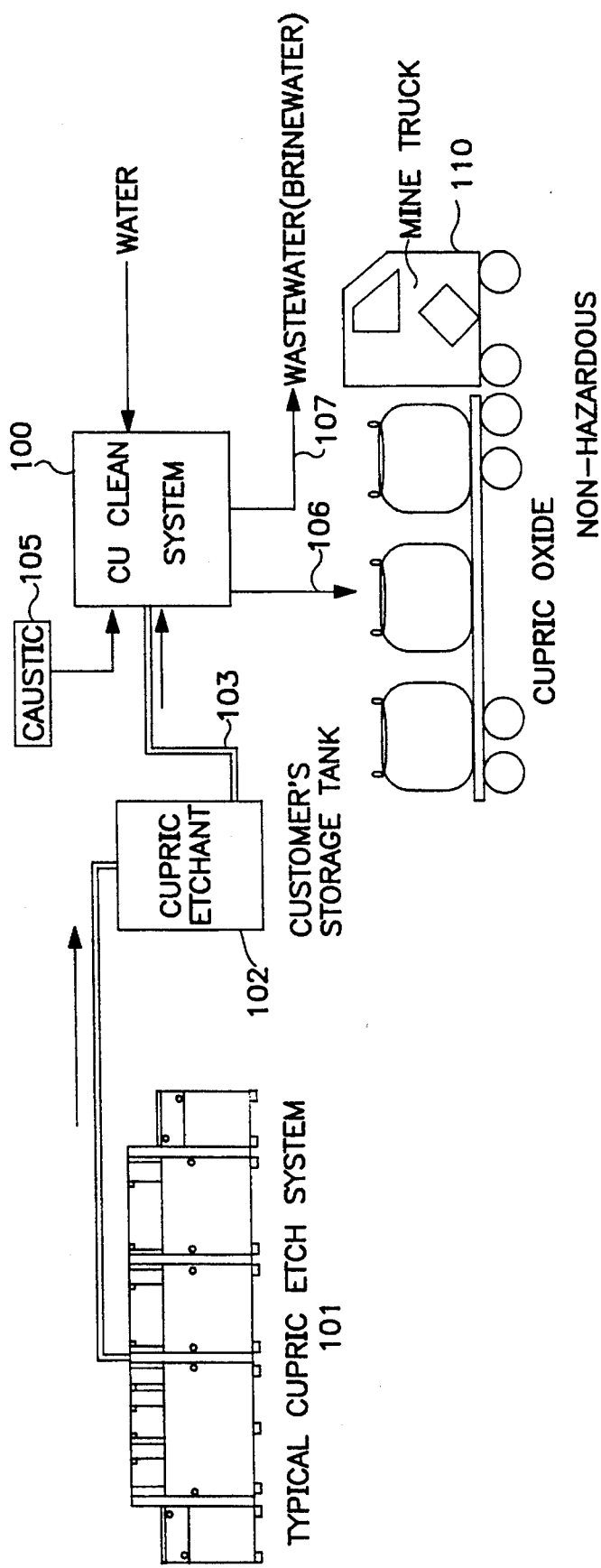
FIG. 1 illustrates in block form a typical application of a system in accordance with the principles of the invention.

FIG. 1 illustrates a system and process in accordance with the principles of this invention. A typical cupric etch system 101 produces a spent etchant solution which is stored in tank 102 at or near the printed circuit board manufacturing site. In accordance with the invention the spent etchant solution is processed to produce non-hazardous material.

More specifically, a system 100 in accordance with this invention receives the spent cupric etchant from storage tank 102 via, for example, pipe 103 and combines it with a caustic solution 105. The byproducts of the process employed are cupric oxide 106 and wastewater 107 which is brine water ($NaCl+H_2O$). The cupric oxide 106 may, for example, be transported via truck 110 to a mine as feedstock.

The system described herein as an illustrative embodiment is a batch processing system and is highly portable.

Figure 2:
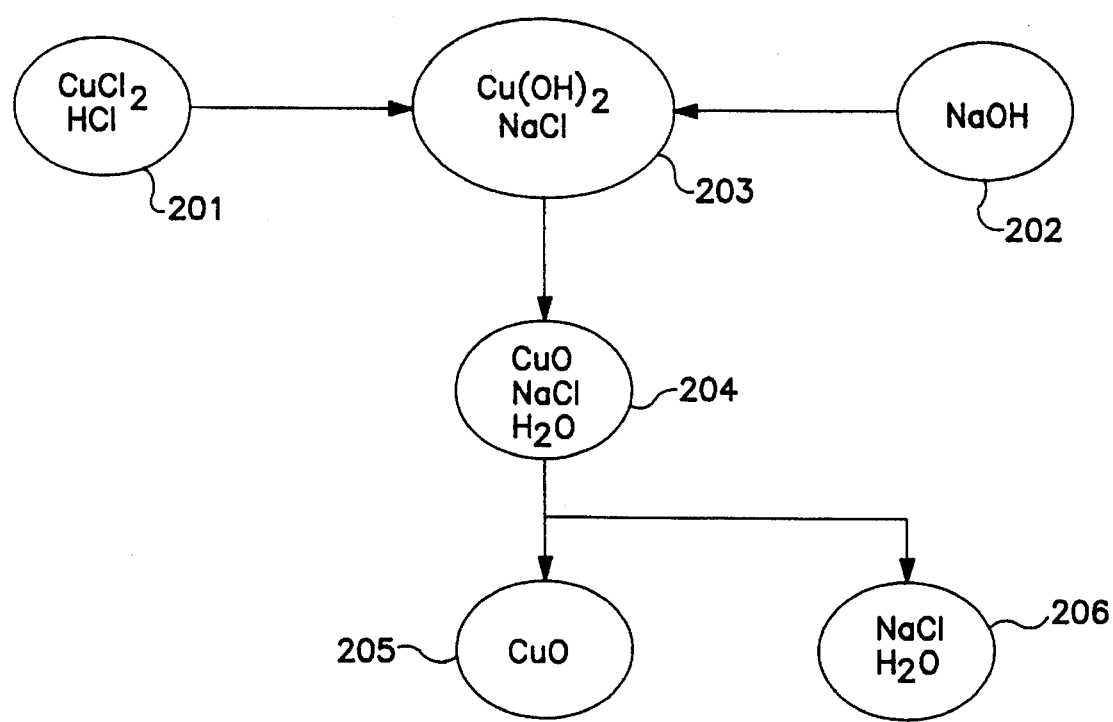
FIG. 2 is a diagram showing in block form the process which occurs in system 100 of FIG. 1 for converting spent cupric chloride into copper oxide and a saline water solution.

Turning now to FIG. 2, the spent cupric etchant 201 from the printed circuit board operation comprises cupric chloride ($CuCl_2$) and hydrochloric acid (HCl). In the process in accordance with the invention, the spent cupric etchant is preheated. In addition, a caustic solution 202 (NaOH) is likewise preheated. The preheated cupric etchant and the caustic are combined together in a reaction 203 that results in neutralizing the cupric etchant to produce a copper hydroxide precipitant and a saline solution. The reaction 203 continues without added heat to convert the copper hydroxide solids to fine copper oxide solids in the saline solution 204. In a further step in the process, the fine copper oxide solids are separated from the saline solution. After a dewatering cycle, fine copper oxide solids 205 are ready for shipment as a feedstock material. The saline water 206 may be disposed of as waste water.

The control of the temperature before and after mixing, along with the pH of the separate and combined solutions are important as is controlled flow of the solutions through a mixing zone, where an exothermic reaction is initiated. This allows the reaction to complete in a relatively short time, saving on energy and operating time.

Figure 3:
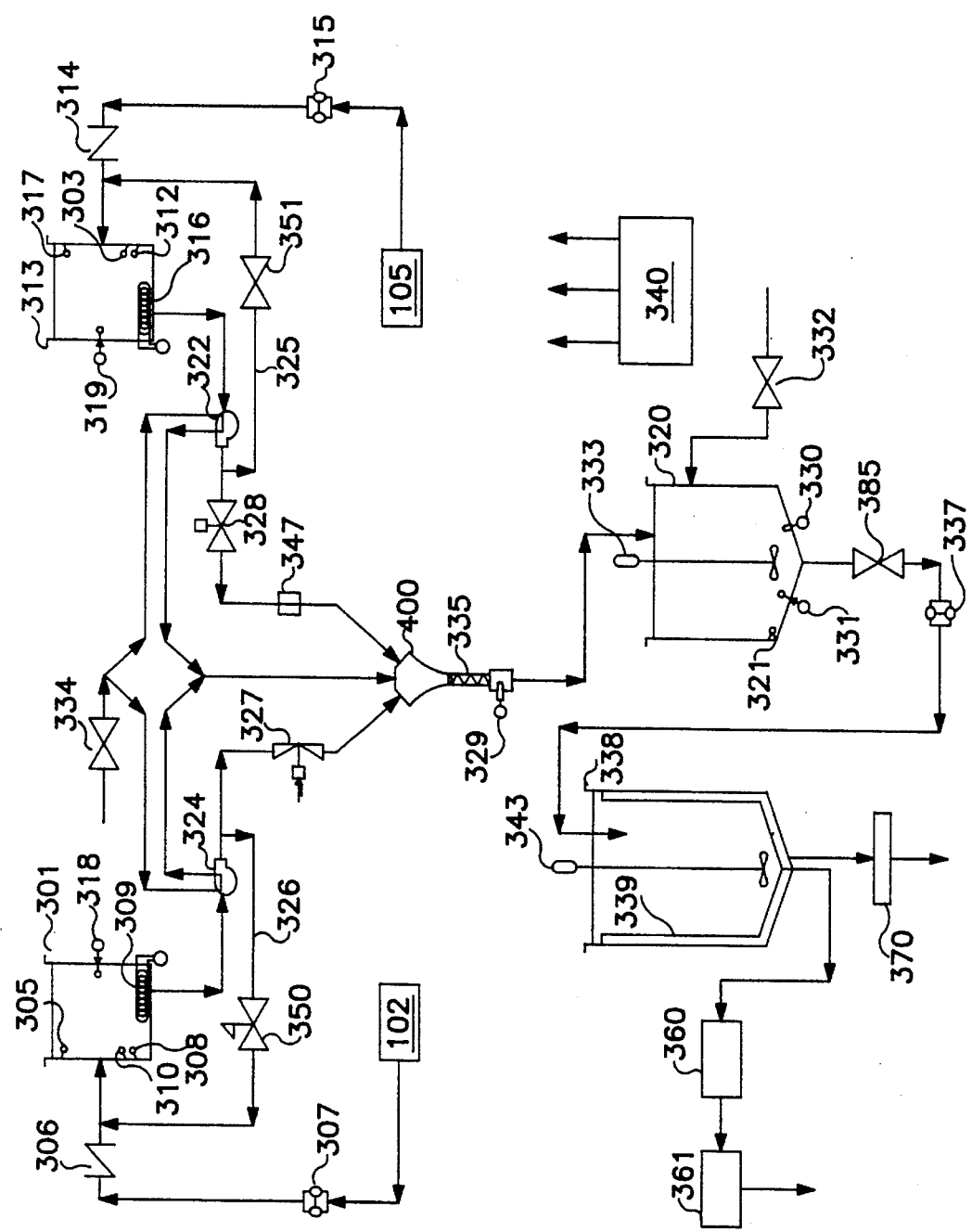
FIG. 3 illustrates in partially schematic and partial block format the apparatus in accordance with the invention which is used to carry out the process.

The apparatus of the illustrative embodiment used to process spent cupric chloride etchant is shown in FIG. 3. In the illustrative system, two tanks 301 and 313 are used. Each tank is a commercially available tank of polypropylene construction. Each tank includes three fluid level sensors 305, 308, 310, 312, 303 and 317 which are of conventional design and commercially available. Each of the tanks 301 and 313 also includes electrically operated heating elements 309 and 316, respectively. The heating elements 309 and 316 are likewise commercially available. Each tank 301 and 313 further includes a temperature sensor 318 and 319, respectively, which likewise are commercially available components. The level sensors 308 and 312 are used to signal that the level within the respective tanks 301, 313 is at or below a critically low level in the tank. The low level sensors 310 and 303 are used to indicate that the fluid level within the respective tank is at the lowest desired operational level. In addition, the liquid level sensors 305 and 317 indicate respectively when the fluid level is near capacity for the tank. Each of the various sensors is interfaced to a controller unit 340. The connections to the controller are not shown.

Initially, level sensor 305 would indicate that the tank 301 is not full and controller unit 340 causes pump 307 to be activated to cause tank 301 to be filled with cupric chloride etchant from the storage tank 102 through check valve 306. As tank 301 is being filled, sensor 308 will eventually indicate that the fluid level is above the critical low level. Controller 340 will then activate the heater 309 to begin preheating of the etchant. When liquid high sensor 305 signals that the tank is nearly full, the controller 340 turns off pump 307.

If either sensor 312 or sensor 303 indicates that the liquid level in tank 313 is below the critically low level or the low level, pump 315 is activated to begin pumping a caustic solution from tank 105 into the tank 313 via check valve 314. As tank 313 is being filled sensor 312 will eventually indicate that the fluid level is above the critical low level. Controller 340 will then activate heater 316 to begin preheating the caustic solution. When liquid high level sensor 317 senses that the capacity in the tank 313 is nearly full the controller 340 turns off pump 315.

After the system is initially started, the critically low level sensors 308 and 312 activate an alarm and shut the system down when liquid levels in their respective tanks 301, 313 are less than the liquid levels indicated by the sensors. The critically low levels sensed by sensors 308 and 312 should not occur after initial filling/start-up unless processing is complete. Heaters 309 and 316 activate and heat the liquids in the respective tanks as long as sensors 308 and 312 indicate liquid levels are at or above the critically low level. The spent etchant in tank 301 will be heated to 120° F. by heater 309 and maintained at that temperature by temperature sensor 318. Likewise, temperature sensor 319 in preheat tank 313 is used to sense and maintain the temperature of the caustic solution also at 120° F.

The selection of the temperature of 120° F. has been arrived at by experimentation. We have experimented with temperature ranges 45° F. to 150° F. for the etchant and 70° F. to 150° F. for the caustic solution. From our experimentation the threshold temperature at which consistent results occur is 100° F. The optimum temperature for obtaining consistent quality results is between 120° F. and 150° F.

Based upon our experimentation, a temperature in the range of 100° to 200° F. will enhance the exothermic reaction and speed completion of the neutralizing reaction and the conversion reaction.

If the temperature in either tank 301 or 313 reaches a critical temperature as measured by sensors 318 and 319 then the controller 340 activates an alarm and shuts the system down. Each heater 309 and 316 includes a protective thermocouple. If the protective thermocouple of either heater 309 or 316 reaches a designated over temperature set point, the heaters 309 and 316 will be disabled and the controller 340 will activate an alarm and shut the system down. Not shown in the drawing is the connection between the heater and controller 340.

Each of the tanks 301 and 313 has an outlet which is connected to a respective pump 324,322. In the illustrative embodiment, both pumps are commercially available fixed shaft centrifugal pumps. The outlets of each of the pumps 324, 322 is coupled via valves 327 and 328, respectively, to a mixing "y" 400 which will be described further below. Disposed between pump 322 and mixing "y" 400 is a flow control valve 347. In addition, each of the pumps 324 and 322 is coupled to a corresponding pressure relief line 326 and 325 respectively, back to the tanks 301 and 313. Disposed within each relief line is a valve 350 and 351, respectively.

At the start of processing a batch of etchant, when the solutions in tanks 301 and 313 each reach their temperature set points, and the liquid level sensors 305 and 303 indicate that there is sufficient liquid in the tanks 301 and 313, then controller 340 activates pumps 322 and 324 which will circulate liquid from their respective tanks 313 and 301 through their corresponding pressure relief lines 326 and 325. This condition is maintained for approximately one minute to eliminate any crystal formation that may have occurred in the impeller housings of the pumps 322 and 324.

When the recirculation time expires, controller 340 opens valves 327 and 328 to allow the fluids to flow through their corresponding lines. Valve 327 is a pneumatically controlled diaphragm valve that will be opened to a pre-determined position such that the flow of the cupric chloride will be approximately 3 times the flow of the caustic. The flow of caustic being determined by flow control valve 347, which is a fixed flow valve.

Mixing "y" 400 is coupled to a static mixer 335. The output of the static mixer flows to a mixing tank 320. Mixing tank 320 is in the illustrative example, a 70 gallon polypropylene tank. The mixing tank includes a mixer 333 which again is a commercially available product.

During the first portion of the batch operation, Controller 340 adjusts the flow through the valve 327 based upon the pH in the static mixer 335 as determined from output of a pH sensor 329 located just below the static mixer 335. When a low liquid sensor 321 in mixing tank 320 indicates that the liquid level in tank 320 is above a predetermined level, the controller 340 switches to monitoring the pH in the mixing tank 320 via pH sensor 330 which is positioned in the mixing tank 320. If the pH in the mixing tank 320 is less than a pre-determined set point then the flow through the valve 327 is decreased by controller 340 such that the pH measured in the tank 320 will increase toward the set point. Similarly, if the pH in mixing tank 320 is greater than the set point by plus 0.5, controller 340 opens valve 327 to lower the pH to the set point. PH control is maintained by controller 340 for the remainder of the batch.

Mixing tank 320 also includes a temperature sensor 331 which provides signals to the controller 340. Temperature sensor 331 measures the reaction temperature in the mixing tank 320. Should the temperature in the mixing tank 320 reach a critical temperature set point, controller 340 opens a valve 332 to add city water until the rise in reaction temperature is stopped or is lowered to only 1° below the temperature set point.

When the low liquid level sensor 310 in preheat tank 301 indicates that the liquid is below the low level, controller 340 closes valves 327 and shuts off pump 324. However, controller 340 will operate pump 322 if it is necessary to adjust for the pH in mixing tank 320.

After the valve 327 closes and pump 324 has been shut off, the controller 340 activates pump 307 to refill tank 301 with spent cupric etchant solution and begin preheating for the next batch. If liquid low sensor 303 indicates a low level, then controller 340 activates pump 315 to fill tank 313 with liquid caustic and to preheat.

The slurry in the mixing tank 320 will be mixed for a pre-determined time by the mixer 333.

To extend the life of a system, an automatic rinsing arrangement is provided. When the temperature in the mixing tank is at or below a predetermined temperature, controller 340 initiates a rinse cycle. A valve 334 is opened for a pre-determined time, which in the illustrative embodiment is 15 seconds to 1 minute depending upon the customer's city water pressure. With valve 334 open clean city water is sent through the pumps 324, 328 as well through the mixing "y" 400 and static mixer 335 and over pH sensor 329. This prevents cupric and caustic crystallization on the pump shafts, thereby lengthening the life of the pumps as well as cleaning other components of the system.

After the rinse cycle, controller 340 opens valve 385 and operates pump 337 to pump the contents of the mixing tank 320 into a filtration tank 338. The filtration tank 338 includes a mixer 343 and a filtration bag 339 which separates the cupric oxide from the brine solution. The resulting concentrated cupric oxide may then be rinsed 360 and dewatered 361. To further separate the fine cupric oxide from the brine to be discharged, a commercially available filter 370 having a 1 to 3 micron mesh is utilized.

The controller 340 manages operation of the various valves and controls the sequence of events. The controller 340 includes both a programmable logic controller portion and a process controller of any conventional type and those skilled in the art can select an appropriate unit and program it to operate in accordance with the sequences described hereinabove.

By preheating the starting materials i.e., cupric chloride and a 50 percent caustic solution, and by using the exothermic heat of reaction to drive the reaction to completion, the time and cost of a high temperature mix tank is eliminated. We have determined that in our process, an exothermic reaction occurs during mixing of the reagents (cupric and caustic) and an endothermic reaction follows where the heat is absorbed by the copper hydroxide being formed into copper oxide and release of water. If the starting solutions are not heated, the reaction "flattens" out and does not reach the desired pH within the time frame and resulting solids look less black, the color of copper oxide. The flow rates of the reactants also play a role in controlling the reaction. If caustic is added too slowly, the reaction "stalls" at the blue/grey, hydroxide stage which is of gel-like consistency. If the caustic is added too quickly, the reaction exotherms violently and the pH level shoots up quickly and does not drift downward enough to meet desired specifications of a pH level of 10.

To achieve good mixing on a dynamic basis, streams of the cupric chloride solution and the caustic solution are mixed by the use of a 45° "y" 400 in conjunction with a static mixer 335. Mixing the streams in a "y" permits fast reaction of the etchant and caustic to occur, without interference of the hydroxide and oxide solids being formed, due to impingement of the two streams. This speeds the reactions. The static mixer 335 breaks up solids which form and assures complete reaction to oxide.

Figure 4:
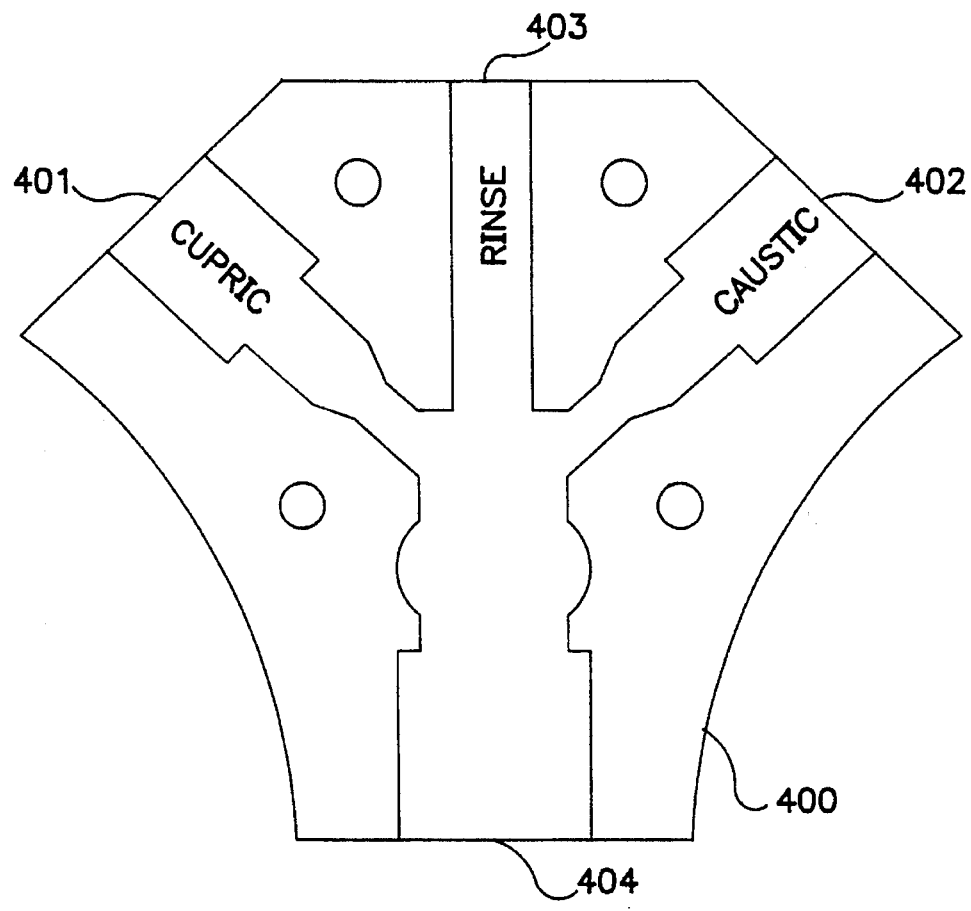
FIG. 4 illustrates a mixing "y" utilized in the system of FIG. 3.
Figure 5:
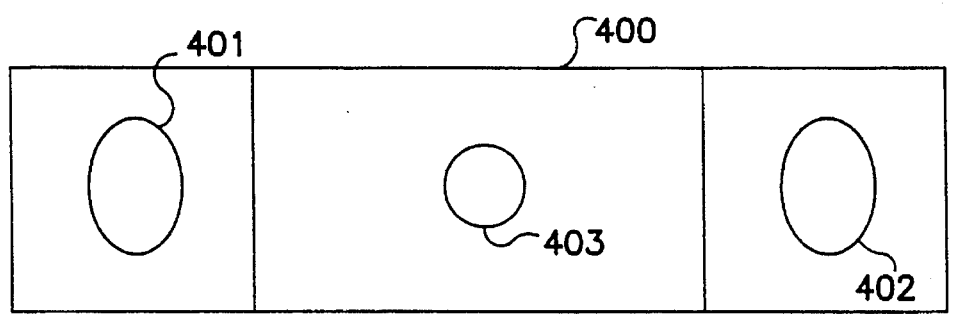
FIG. 5 is a top view of the device of FIG. 4.

The 45° "y" 400 is more clearly shown in FIGS. 4 and 5. As shown in the side cross section of FIG. 4, the first flow passage 401 receives the spent cupric chloride solution and a second passage 402 receives a caustic solution. The two passages 401 and 402 are disposed at 45° from a central vertical axis. The 45° "y" is a simple and cost effective way to start the process of intimately mixing two chemical streams to achieve consistent results in spite of varying input concentrations. From the 45° "y" the resulting mixture stream enters a static mixer which is attached to the discharge end 404 of the 45° "y" and where additional mixing takes place. The 45° angle from the vertical was chosen for two reasons: (1) it is a steep enough angle to prevent backflow from the mix streams when pressure builds up inside the mixing chamber; and (2) it causes the cupric and caustic streams to intersect perpendicular to each other which it is believed is the best condition for causing a violent (impingement) mixing. A smaller angle which still prevents backflow from occurring, but the mixing prior to the static mixer may not be as complete.

Another important benefit of using the 45° "y" is having the ability to size its input lines so that equal velocities of the two streams being mixed can be easily achieved. When two intersecting streams of dissimilar flow rates pass through equal diameter pipes, they result in unequal mixing. This happens because the faster flow rate stream is at a higher velocity and moves past and does not mix with the other stream as it enters the static mixer. In the present invention the flow of cupric is three times the flow of caustic. Therefore, the diameter of the caustic input line needs to be roughly three times smaller than the diameter of the cupric input line (flow/area equal velocity), thus providing equal velocity streams. Not only is it significant to maintain equal velocities of two streams so that more proportionate and thorough mixing is provided, but also to prevent the formation and escape of gases (such as chlorine) before the resulting slurry enters the mixing tank which is open to the atmosphere. If gas does form, the confined and violent mixing in the "y" 400 will immediately cause the gas to react with the incoming caustic.

The mix stream flows from the 45° "y" 400 into the static mixer 335. The static mixer 335 is commercially available.

The automatic rinsing system utilized in this system in accordance with the invention can provide important controlled cleaning for the input pumps, mixing zone, and inline pH probe utilizing a very minimal amount of water, typically less than two gallons. The rinsing process is controlled by the controller 340 and automatically occurs a few minutes after the conversion of cupric chloride to copper oxide has been completed, and lasts anywhere between several seconds to minutes depending upon the customer's water pressure. Turning back to FIG. 3, the description of the process will be provided in greater detail. Solenoid valve 334 opens and city water flows around the shafts and seals of input pumps 324 and 322. The water flushes out any chemicals that may have leaked through the seals and prevents crystals from developing between the shaft and seals of each pump. This will reduce maintenance time and extend the life of the pumps 324 and 322.

The rinsing system is designed to prohibit oxide cake buildup on the inside of the mixing zone which consists of the 45° "y" 400 and the static mixer 335. After the water flows through each pump the two streams are combined into one stream and directed to the rinsing input 403 on the 45° "y" 400. The water passes through the 45° "y" 400 and static mixer 335, cleaning both. It is important that the static mixer stay clean. Oxide cake buildup on its blades could eventually clog the line. The rinse water passing through the static mixer 335 also cleans oxide off the pH sensor 329. This also keeps the reference junction of the pH sensor moist until the next batch starts. This is important since a pH sensor will not operate properly once its reference junction dries out. The rinse water which could contain small quantities of cupric oxide, cupric and caustic is discharged to the mixing tank and mixes with the cupric oxide. The total volume of water used for rinsing is typically no more than two gallons.

Figure 6:
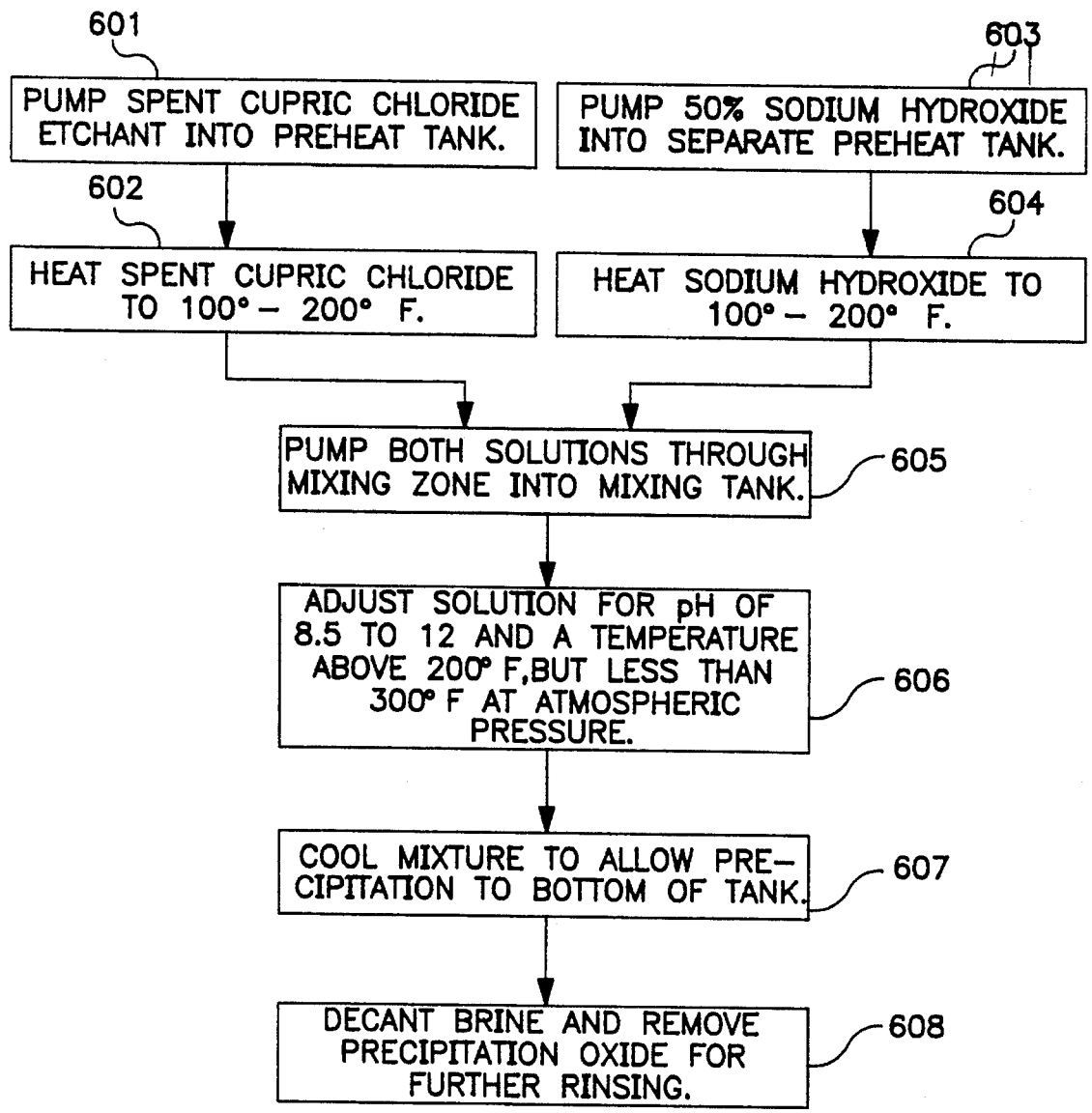
FIG. 6 is a flow diagram of the process utilized in the apparatus of FIG. 3.

Turning now to FIG. 6, the process of the present invention is summarized. Initially, spent cupric chloride etchant is pumped into a preheat tank and is heated to a temperature between 100° and 200° F. Likewise, a 50 percent sodium hydroxide solution is pumped into a separate preheat tank heated to a temperature between 100° and 200° F. In the illustrative embodiment, a temperature of 120° was used for both the cupric chloride etchant and the sodium hydroxide. The heated sodium hydroxide and the heated cupric chloride are both pumped through a mixing zone into a mixing tank. The solution in the mixing tank is adjusted for pH of 8.5 to 12 and a temperature of between 200° and 300° F. at atmospheric pressure. The mixture in the mixing tank is allowed to cool to allow precipitation to the bottom of the tank and the brine may be drawn off and the precipitate oxide removed for further rinsing. By way of example, if we assume that the cupric etchant contains 22 ounces of copper per gallon, this equals 167 g/l, or 2.6 Normal, and further assume that the HCl content of etchant is 1.5 Normal, the caustic is 50 percent by weight which equals 760 g/l, or 19 molar and that there are 1.26 grams of CuO per gram of Cu. Then a one liter cupric solution requires 5.6 equivalents of NaOH which equals 0.3 liter caustic, 1.5N HCl equals 1.5 equivalents of NaOH which equals 0.08 liter caustic for a total of 0.38 liter caustic per liter cupric. One to two liters of rinse water are added. Up to 75 percent of the rinse water is reused. Under those conditions the following results are obtained: 160 grams of copper ×1.26 grams of oxide/gram copper equal 210 grams of oxide with approximately 0.18 liter adsorbed water and 1.2 liters of brine water (from reaction and starting materials) plus rinse water.

Figure 7:
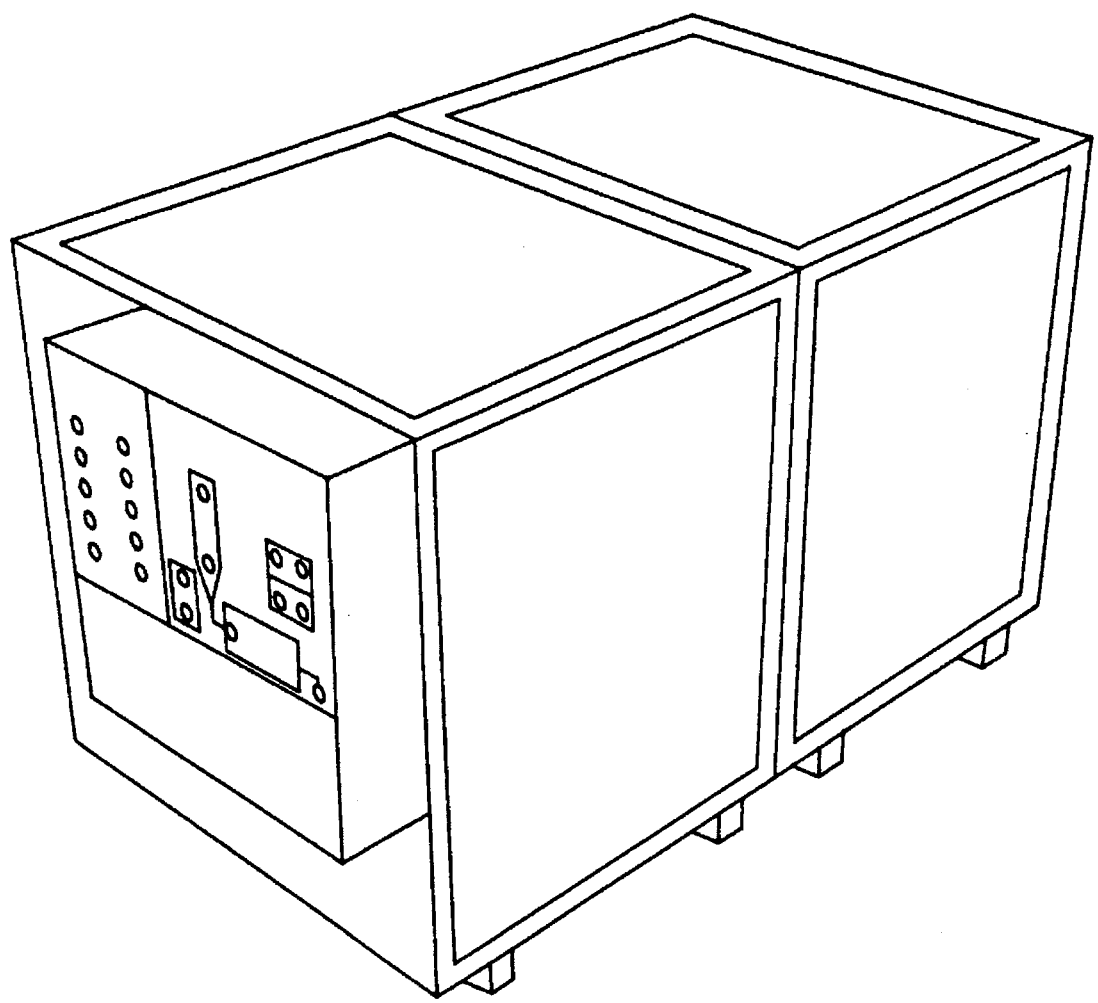
FIG. 7 illustrates the system of the invention in portable form.

The entire apparatus of the system may be assembled into a self-contained unit which is illustrated in FIG. 7 and which is easily transportable to customer sites.

Although the process and apparatus of the invention have been described by means of but a single illustrative embodiment, it will be apparent to those skilled in the art that various changes may be made to both the apparatus and the process without departing from the spirit and the scope of the invention.

What is claimed is:

1. A process for conversion of etchant into non-hazardous material comprising the steps of:
    adjusting the temperatures of said etchant to a first temperature;
    adjusting the temperatures of a caustic solution to a second temperature;
    combining stream of said etchant at said first predetermined temperature with a stream of said caustic at said second temperature to produce a mixed stream in which a neutralization reaction occurs.

2. A process in accordance with claim 1 wherein:
    said etchant stream and said caustic stream are of substantially equal velocity.

3. A process in accordance with claim 2 wherein:
    said etchant stream is at a flow rate which is in proportion to said caustic stream.

4. A process in accordance with claim 1 wherein:
    said combining step is carried out by directing said first and said second streams each at an angle relative to said mixed stream.

5. A process in accordance with claim 4 wherein:
    said angle is 45° from an imaginary axis extending through said mixed stream.

6. A process in accordance with claim 1 wherein said etchant is a cupric etchant.

7. A process in accordance with claim 6 wherein said caustic is a sodium hydroxide solution.

8. A process in accordance with claim 7 wherein:
    said first temperature and said second temperature each is above 100° F.

9. A process in accordance with claim 8 wherein:
    each of said first temperature and said second temperature is selected to be equal to or greater than 120° F.

10. A process in accordance with claim 1 including the further step of:
    automatically adjusting the relative flow rates of said etchant and caustic streams to control the pH in said mixed stream.

11. A process in accordance with claim 10 further comprising the step of:
    capturing said mixed stream in a reaction tank and allowing the reaction to continue to completion without adding heat to said reaction tank.

12. A process for converting a metal-bearing acid solution to a non-hazardous material containing metal salt comprising the steps of:

heating said acid solution to a first temperature;

heating a concentrated base solution to a second temperature;

producing a first stream of said acid solution at said first temperature;

producing a second stream of said base solution at said second temperature;

impinging said first and second streams into a mixed stream in which an exothermic reaction occurs;

adjusting the flow of said first and second streams relative to each other to maintain a pH level in the mixed stream.

13. A process for converting cupric chloride etchant into non-hazardous material comprising the steps of:

adjusting the temperature of said cupric chloride etchant to a temperature;

adjusting the temperature of a sodium hydroxide solution to a second temperature;

combining a stream of said cupric chloride etchant at said temperature with a stream of said sodium hydroxide at said second temperature to form a combined stream;

allowing a neutralization reaction to occur in the combined stream without addition of heat whereby cupric oxide and a saline solution are produced; and separating the cupric oxide from the saline solution by means of a filter.

14. A process in accordance with claim 13 wherein:

said temperature and said second temperature are each over 100° F.

15. A process in accordance with claim 14 wherein:

said temperature and said second temperature are both equal to or greater than 120° F.

16. A process in accordance with claim 13 wherein:

said sodium hydroxide stream and said cupric chloride etchant stream are each directed at an angle of 45° from the axis of the mixed stream.

17. A process in accordance with claim 13 comprising the further step prior to said separating step of:

receiving said combined stream in a tank and allowing said neutralization reaction to carry on to completion without the addition of heat.

18. A process in accordance with claim 13 comprising:

monitoring the pH of the solution in said tank and adjusting the flow of at least one of said sodium hydroxide stream and said cupric chloride etchant stream to maintain said pH within a range.

19. Cupric oxide produced in accordance with the process of claim 13.

20. Apparatus for automatically converting cupric chloride etchant into non-hazardous material comprising:

a first heater for heating said etchant to a first temperature to produce heated etchant;

a second heater for heating a sodium hydroxide solution to a second temperature to produce heated caustic; a first pump for producing a first stream of heated etchant; a second pump for producing a second stream of heated caustic;

a mixing "y" for combining said stream of heated etchant and said stream of heated caustic into a mixed stream, wherein a neutralization reaction is initiated;

a static mixer coupled to said mixing "y" in which said neutralization reaction occurs without added heat;

a mixing tank receiving the output of said static mixer;

said neutralization reaction being allowed to continue to completion in said mixing tank without added heat to produce copper oxide and a saline solution; and a separator for separating said copper oxide from said saline solution.

21. Apparatus in accordance with claim 20 comprising:

a controller for automatically controlling the operation of said first and second heaters and said first and second pumps.

22. Apparatus in accordance with claim 21 wherein:

said first and second temperatures are greater than 100° F.

23. Apparatus in accordance with claim 22 wherein:

said first and second temperatures are preferably 120° F. or greater.

24. Apparatus in accordance with claim 21 comprising:

a first pH sensor monitoring the pH below or downstream from said static mixer; and wherein said controller adjusts the flow of at least one of said heated etchant and said heated caustic to automatically maintain a pH level below or downstream from said static mixer.

25. Apparatus in accordance with claim 21 comprising:

a second pH sensor for monitoring the pH in said mixing tank; and wherein said controller adjusts the flow of at least one of said heated etchant and said heated caustic to automatically maintain a pH level in said mixing tank.

26. Apparatus in accordance with claim 20 wherein:

said apparatus is portable as an integrated unit.

27. Apparatus in accordance with claim 20 comprising:

a controller;

said controller controlling the operating of said first and second pumps;

a first recirculation loop for recirculating said heated etchant through said first pump;

a second recirculation loop for recirculating said heated caustic through said second pump; and whereby said controller causes said first pump to recirculate said heated etchant through said first recirculation loop and said second pump to recirculate heated caustic through said second recirculation loop at times.

28. Apparatus in accordance with claim 24 comprising:

a second pH sensor for monitoring the pH in said mixing tank; and wherein said controller adjusts the flow of at least one of said heated caustic and said heated etchant to automatically maintain a pH level in said mixing tank.

* * * * *